(12) United States Patent
Gellert et al.

(10) Patent No.: US 6,302,680 B1
(45) Date of Patent: *Oct. 16, 2001

(54) INJECTION MOLDING APPARATUS WITH REMOVABLE NOZZLE SEAL

(75) Inventors: Jobst Ulrich Gellert, Georgetown; Itsuto Nakanishi, Toronto, both of (CA)

(73) Assignee: Mold-Masters Limited, Georgetown (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/261,466

(22) Filed: Feb. 24, 1999

(30) Foreign Application Priority Data

Feb. 16, 1999 (CA) .................................. 2262175

(51) Int. Cl.[7] ................................................ B29C 45/23
(52) U.S. Cl. ......................... 425/549; 425/562; 425/564
(58) Field of Search ............................. 425/549, 562, 425/564

(56) References Cited

U.S. PATENT DOCUMENTS

| | | |
|---|---|---|
| 3,935,972 | 2/1976 | Tsunemoto et al. .......... 222/146 HE |
| 4,010,903 | 3/1977 | Sakuri et al. .................. 239/533.1 |
| 4,266,723 | 5/1981 | Osuna-Diaz .................... 239/132 |
| 4,793,795 | 12/1988 | Schmidt et al. . |
| 5,028,227 | 7/1991 | Gellert et al. . |
| 5,208,052 | 5/1993 | Schmidt et al. ............... 425/549 |
| 5,299,928 | 4/1994 | Gellert . |
| 5,795,599 | 8/1998 | Gellert . |
| 5,849,343 | 12/1998 | Gellert et al. . |
| 5,871,786 | 2/1999 | Hume et al. ................... 425/549 |
| 5,879,727 | 3/1999 | Puri . |
| 5,895,669 | 4/1999 | Seres, Jr. et al. ............. 425/549 |
| 6,009,616 | 1/2000 | Gellert .......................... 29/611 |

FOREIGN PATENT DOCUMENTS 0 854 027  7/1998  (EP) .
8 004 819  4/1982  (NL) .

*Primary Examiner*—Tim Heitbrink
(74) *Attorney, Agent, or Firm*—Foley & Lardner

(57) ABSTRACT

Injection molding apparatus having a removable nozzle seal (110) which screws onto the outside of the front end (76) of a heated nozzle (12). A mounting sleeve (98) having a threaded outer surface (104) is integrally mounted around the front end (76) of the nozzle (12). The nozzle seal (110) has a retaining portion (118) with a threaded inner surface (120) to screw onto the mounting sleeve (98) extending rearwardly from a central nut portion (112). A sealing and alignment flange portion (122) extends forwardly from the central nut portion (112) and fits into a cylindrical portion (124) of a well (14) in the mold (18) to accurately align the front end (76) of the nozzle (12) and prevent melt leakage between the heated nozzle (12) and the surrounding cooled mold (18). In another embodiment, a sealing and alignment portion (136) of the nozzle seal (110) extending forwardly into an opening (148) in the mold (18) forms the gate (90).

16 Claims, 4 Drawing Sheets

INJECTION MOLDING APPARATUS WITH REMOVABLE NOZZLE SEAL

BACKGROUND OF THE INVENTION

This invention relates generally to hot runner injection molding and more particularly to injection molding apparatus having a removable nozzle seal which screws onto the outside of the front end of the heated nozzle.

Nozzle seals bridging the insulative air space between the heated nozzle and the surrounding cooled mold are well known. U.S. Pat. No. 4,793,795 to Schmidt et al. which issued Dec. 27, 1988 shows a gate insert which screws into place and U.S. Pat. No. 5,028,227 to Gellert et al. which issued Jul. 2, 1991 shows a gate insert which slides into place. U.S. Pat. No. 5,299,928 to Gellert which issued Apr. 5, 1994 shows a two-piece nozzle seal which screws into place. U.S. Pat. No. 5,849,343 to Gellert et al. which issued Dec. 15, 1998 shows another type of gate insert which screws into place. While these previous nozzle seals and gate inserts are suitable for many applications, they all have the disadvantage that they are seated in an opening on the inside of the nozzle. This limits the size of any insert or liner seated in the front end of the nozzle which, in turn, restricts the strength and thermal conductivity from the heating element to the gate. The ones that screw in have the further disadvantage that location of the front end of the nozzle is not accurate enough for some applications.

It is also known to provide a sealing ring extending around the outside of the nozzle. For instance, U.S. Pat. No. 5,795,599 to Gellert which issued Aug. 18, 1998 shows a nozzle guide and sealing ring mounted around the outside of the front end of the nozzle.

SUMMARY OF THE INVENTION

Accordingly, it is an object of the present invention to at least partially overcome the disadvantages of the prior art by providing a removable nozzle seal which screws onto the outside of the front end of a heated nozzle.

To this end, in one of its aspects, the invention provides an injection molding apparatus having one or more heated nozzles extending forwardly into a well in a cooled mold in alignment with a gate leading to a cavity. There is an insulative air space extending between the heated nozzle and the surrounding cooled mold. The heated nozzle has a rear end, a front end, and a portion adjacent the front end with a generally cylindrical outer surface. It has a melt bore extending forwardly therethrough from the rear end and an insert extending forwardly from a recessed seat in the front end of the at least one heated nozzle. The insert has a rear end and a melt bore extending forwardly therethrough from an inlet at the rear end aligned with the melt bore through the nozzle. A mounting sleeve is integrally mounted around the cylindrical outer surface of the portion adjacent the front end of the heated nozzle and the mounting sleeve has a threaded outer surface. A hollow removable nozzle seal has a central portion, a retaining portion extending rearwardly from the central portion, and a sealing and alignment flange portion extending forwardly from the central portion. The retaining rear portion has a threaded inner surface to removably screw onto the threaded outer surface of the mounting sleeve. The forwardly extending sealing and alignment flange portion fits into a cylindrical portion of the well in the mold extending adjacent the gate to align the front end of the heated nozzle with the gate and prevent leakage of melt into the insulative air space between the heated nozzle and the surrounding cooled mold.

In another of its aspects, the invention provides injection molding apparatus having one or more heated nozzles extending forwardly into an opening in a cooled mold extending to a cavity. There is an insulative air space extending between the heated nozzle and the surrounding cooled mold. The heated nozzle has a rear end, a front end, a portion adjacent the front end with a generally cylindrical outer surface. It has a melt bore extending forwardly therethrough from the rear end. A mounting sleeve is integrally mounted around the cylindrical outer surface of the portion adjacent the front end of the heated nozzle. The mounting sleeve has a threaded outer surface. A removable nozzle seal has a front end, a central portion, a hollow retaining portion, extending rearwardly from the central portion, and a sealing and locating portion extending forwardly from the central portion. The central portion and the forwardly extending sealing and locating portion has a melt bore extending therethrough in alignment with the melt bore in the heated nozzle and leading to a gate at the front end of the nozzle seal. The retaining rear portion has a threaded inner surface to removably screw onto the threaded outer surface of the mounting sleeve. The forwardly extending sealing and locating portion fits into a cylindrical portion of the opening in the mold extending to the cavity to locate the front end of the heated nozzle and prevent leakage of melt into the insulative air space between the heated nozzle and the surrounding cooled mold.

Further objects and advantages of the invention will appear from the following description taken together with the accompanying drawings.

DETAILED DESCRIPTION OF THE INVENTION

Figure 1:
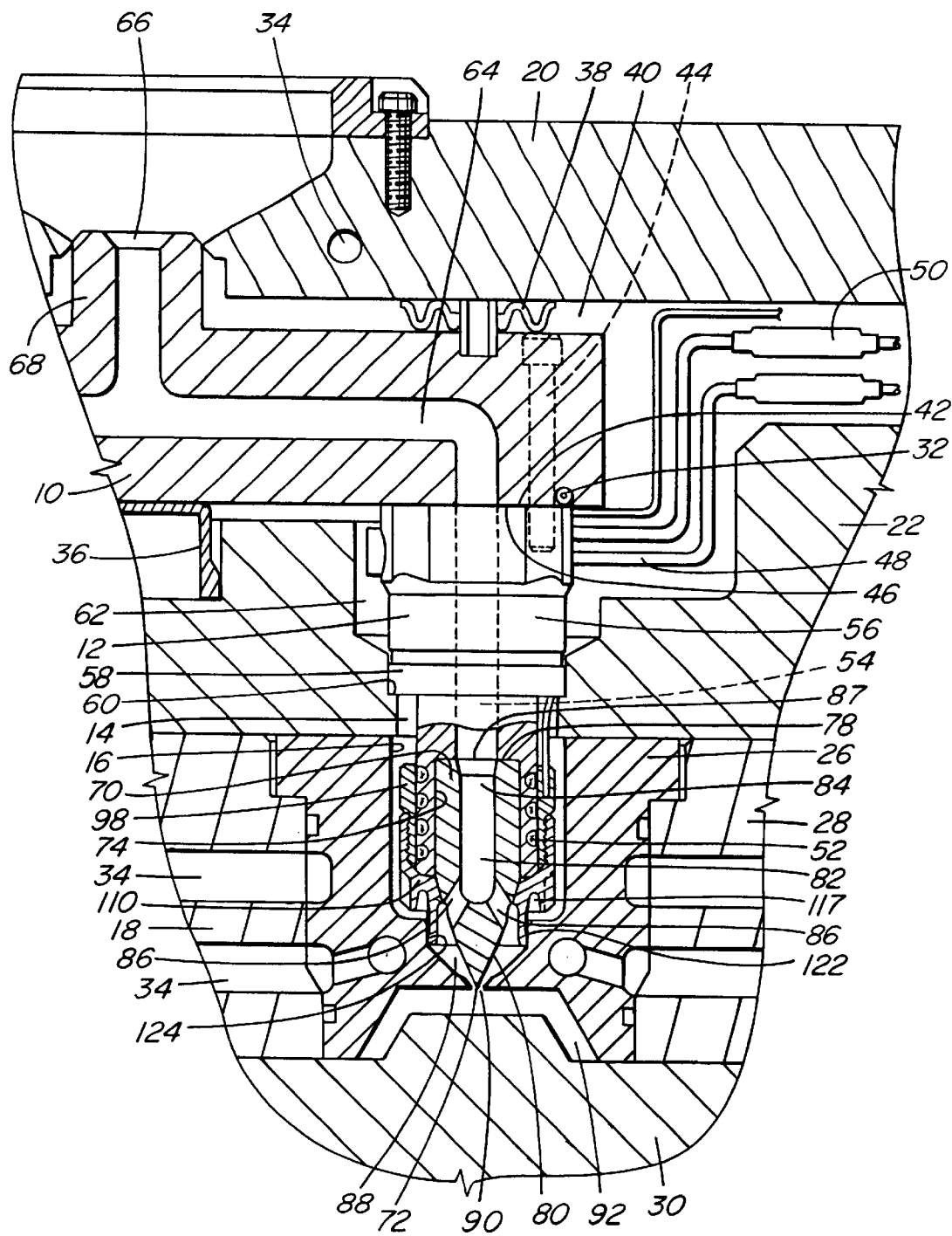
FIG. 1 is a sectional view of a portion of a multi-cavity injection molding apparatus or system having a heated nozzle with a nozzle seal screwed onto the outside of its front end.
Figure 2:
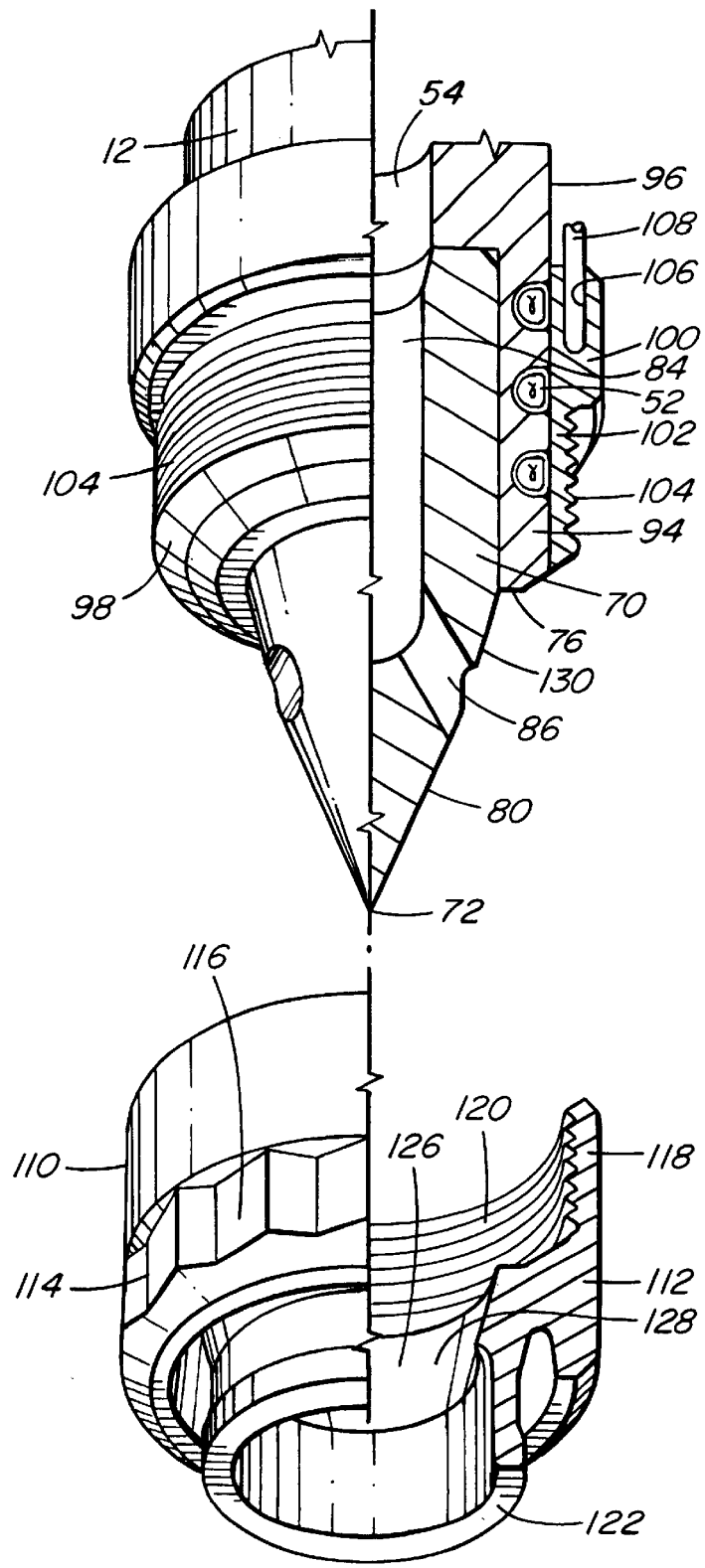
FIG. 2 is an exploded isometric view showing the front end of the nozzle with the mounting sleeve in place and the nozzle seal seen in FIG. 1.

Reference is first made to FIGS. 1 and 2 which show a portion of a multi-cavity injection molding system or apparatus having a melt distribution manifold 10 interconnecting several heated nozzles 12. Each nozzle 12 is seated in a well 14 having a generally cylindrical wall 16 in a mold 18. While the mold 18 usually has a greater number of plates depending upon the application, in this case, only a back plate 20, a manifold plate 22, a cavity insert 26 seated in a cavity plate 28, and a core plate 30 are shown for ease of illustration. The melt distribution manifold 10 is heated by an integral electrical heating element 32 and the mold 18 is cooled by pumping cooling water through cooling conduits 34. The melt distribution manifold 10 is mounted between the manifold plate 22 and the back plate 20 by a central locating ring 36 and a number of insulative spacers 38 to provide an insulative air space 40 between the heated manifold 10 and the surrounding cooled mold 18.

The rear end 42 of each nozzle 12 is secured by screws 44 against the front face 46 of the melt distribution manifold 10. Each nozzle 12 has an integral electrical heating element 48 with a terminal 50 and a helical portion 52 extending around a central melt bore 54. An outer collar 56 at the rear end 42 of each nozzle 12 has a forwardly extending flange portion 58 which sits on a circular seat 60 in the mold 18 to locate the rear end 42 of the heated nozzle 12 and provide an insulative air space 62 between the heated nozzle 12 and the surrounding cooled mold 18.

A melt passage 64 extends from a central inlet 66 in a cylindrical inlet portion 68 of the melt distribution manifold 10 and branches outwardly in the melt distribution manifold 10 to convey melt to the central melt bore 54 in each heated nozzle 12. In this embodiment, the heated nozzle 12 has a tip insert 70 with a pointed front tip 72 shrunk fit into a cylindrical seat 74 in the front end 76 of the heated nozzle 12. The heated nozzle 12 is made of steel and the tip insert 70 is made of a material such as beryllium copper or tungsten carbide copper having a combination of thermal conductivity and wear and corrosion resistance suitable for the material being molded. The tip insert 70 has a rear end 78 and a conical outer surface 80 extending forwardly to the tip 72. It has a melt bore 82 with a slightly tapered central rear portion 84 which splits into two front portions 86 extending diagonally outward from the rear portion 84 to the outer conical surface 80. As can be seen, the rear portion 84 of the melt bore 82 extends through the tip insert 70 from an inlet 87 at the rear end 78 in alignment with the central melt bore 54 extending through the nozzle 12. The melt from the melt passage 64 flows through the melt bore 54 in each nozzle 12 and the melt bore 82 in the tip insert 70 into a space 88 around the conical surface 80 of the tip insert 70 and through the gate 90 into the cavity 92. As seen in FIG. 2, in this embodiment, the two front portions 86 are slightly offset from the center of the tip insert 70 to impart a swirling motion to the melt flowing through the gate 90. Although two diagonal front portions 86 of the melt bore 82 are shown, in other embodiments there can be only one or more than two.

The heated nozzle 12 has a front portion 94 adjacent its front end 76 with a cylindrical outer surface 96. As best seen in FIG. 2, a mounting sleeve 98 having a larger diameter rear portion 100 and a front portion 102 with a threaded outer surface 104 according to the invention extends around the front portion 94 of the nozzle 12. The mounting sleeve 98 is made of hot work tool steel and is integrally brazed in place at the same time the electrical heating element 48 is integrally brazed in place in a vacuum furnace. In addition to providing the threaded outer surface 104, the mounting sleeve 98 provides the heated nozzle 12 with additional bursting or hoop strength and a larger heat sink. As can be seen, the rear portion 100 of the mounting sleeve has a rearwardly open hole 106 therein into which a thermocouple element 108 extends to control the operating temperature.

A hollow removable nozzle seal 110 is mounted on the front end 76 of the nozzle 12. In this embodiment, the nozzle seal 110 is hollow and is made of a suitable wear and corrosion resistant material such as stainless or H-13 tool steel. The nozzle seal 110 has a central nut portion 112 with an outer surface 114 with an even number of outer facets 116 such as the double hex shown to be engaged by a wrench (not shown) to tighten and remove the nozzle seal 110. The central nut portion 112 has an insulation groove 117 to reduce heat loss to the cooled mold 18. In other embodiments, the nozzle seal 110 can be made to be engaged by a different type of tool. The hollow nozzle seal 110 has a cylindrical retaining portion 118 extending rearwardly from the central nut portion 112. The retaining rear portion 118 has a threaded inner surface 120 which fits around the threaded outer surface 104 of the mounting sleeve 98.

The nozzle seal 110 also has a cylindrical sealing and alignment flange portion 122 extending forwardly from the central nut portion 112. The forwardly extending sealing and alignment flange portion 122 is made to fit into a cylindrical portion 124 of the well 14 in the mold 18 extending adjacent the gate 90 to align the front tip 72 of the tip insert 70 with the gate 90 and to provide a seal to prevent leakage of the melt into the insulative air space 62 between the heated nozzle 12 and the surrounding cooled mold 18.

The central nut portion 112 of the nozzle seal 110 has an opening 126 therethrough with a tapered inner surface 128. The tapered inner surface 128 of the opening 126 is made to fit with very close tolerances around a matching outer surface 130 extending around the tip insert 70 which is tapered inwardly towards the front to retain the tip insert 70 in place in the cylindrical seat 74 in the heated nozzle 12 and to very accurately locate the front end 76 of the heated nozzle 12 with the front tip 72 aligned with the gate 90. In another embodiment, the surfaces 128, 130 can have straight and shoulder portions to retain the tip insert 70 in place and to locate the front end of the heated nozzle 12.

Thus, while the threaded rear portion 118 retains the nozzle seal 110, it is the tapered surfaces 128, 130 and the sealing and alignment flange portion 122 which locate the front end 76 of the heated nozzle 12 with the front tip 72 of the tip insert 70 aligned with the gate 90. As these surfaces are not threaded, the location is much more accurate than relying on threaded surfaces. Another advantage of the nozzle seal 110 screwing onto the outside of the heated nozzle 12 rather than the inside, is that it allows the tip insert 70 which is made of a more conductive material to be larger. This increased size provides a larger heat sink and brings the more conductive material into closer proximity to the electrical heating element 48 and provides increased and more uniform heat to the front tip 72 which reduces cycle time. Furthermore, the nozzle seal 110 itself as well as the mounting sleeve 98 being in tension provides additional bursting or hoop strength.

In use, the apparatus is first installed as shown in FIG. 1 and described above. Electrical power is then applied to the heating element 32 in the melt distribution manifold 10 and to the heating elements 48 in each of the nozzles 12 to heat them to a predetermined operating temperature. Pressurized melt is applied from a molding machine (not shown) to the central inlet 66 of the melt passage 64 to provide hot tip gating according to a predetermined injection cycle. The melt flows through the melt distribution manifold 10, the melt bores 54, 82 in the heated nozzles 12 and the tip inserts 70, and through the gates 90 into the cavities 92. After the cavities 92 are filled and a suitable packing and cooling period has expired, the injection pressure is released and the melt conveying system is decompressed to avoid stringing through the open gates 90. The mold 18 is then opened to eject the molded products. After ejection, the mold 18 is closed and the cycle is repeated continuously with the cycle time dependent upon the size of the cavities 92 and the type of material being molded.

Figure 3:
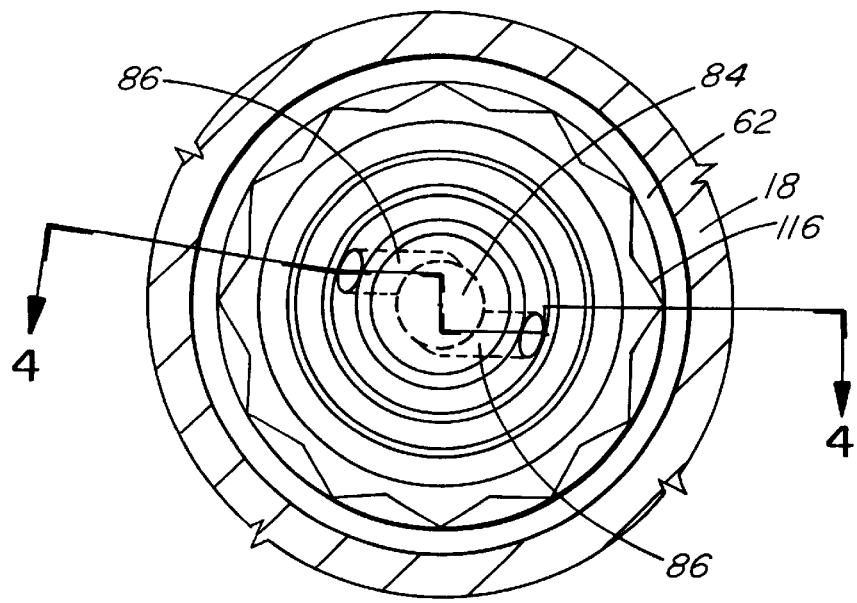
FIG. 3 is a bottom view of the front end of a nozzle having a nozzle seal according to another embodiment of the invention.
Figure 4:
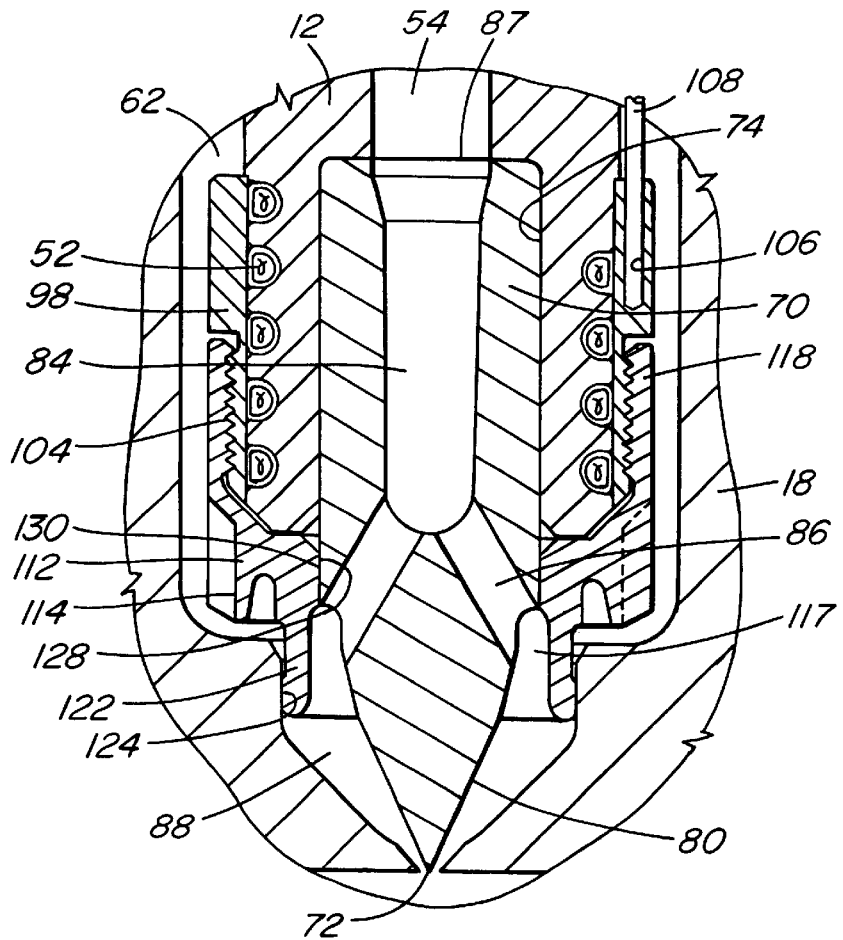
FIG. 4 is a sectional view along line 4—4 in FIG. 3.

Reference is now made to FIGS. 3 and 4 which show a nozzle seal 110 according to another embodiment of the invention. This embodiment is the same as the embodiment described above except that the inner surface 128 of the opening 126 through the central nut portion 112 of the nozzle seal 110 and the matching outer surface 130 of the tip insert 70 are straight rather than tapered. In this embodiment, the tip insert 70 is integrally brazed into place in the cylindrical seat 74 in the front end 76 of the heated nozzle 12 and the taper is not required to retain it in place.

Figure 5:
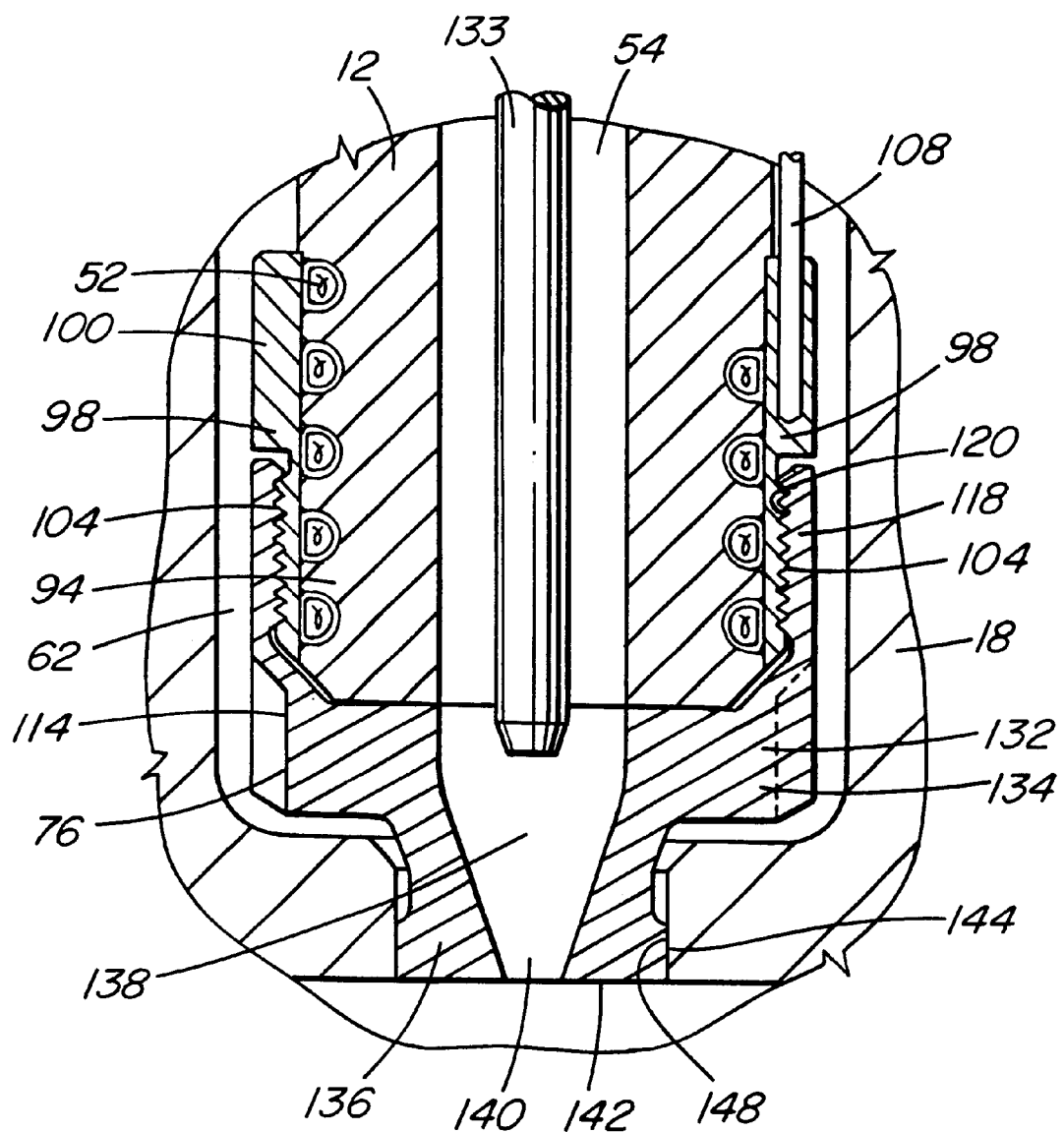
FIG. 5 is a sectional view of the front end of a nozzle having a nozzle seal according to a further embodiment of the invention.

Reference is now also made to FIG. 5 which shows a nozzle seal 132 (which is also a gate insert) according to another embodiment of the invention having a valve pin 133 for valve gating. Some of the elements of this embodiment are the same as described above, and elements common to both embodiments are described and illustrated using the same reference numbers. In this embodiment, the nozzle seal 132 similarly has the hollow cylindrical retaining portion 118 extending rearwardly from a central nut portion 134. The rearwardly extending retaining portion 118 also has the threaded inner surface 120 which screws onto the threaded outer surface 104 of the mounting sleeve 98 which is brazed in place around the front portion 94 of the heated nozzle 12 as described above. However, in this embodiment, the central nut portion 134 and a sealing and locating portion 136 extending forwardly therefrom have a melt bore 138 extending therethrough in alignment with the melt bore 54 in the heated nozzle 12 and leading to a gate 140 at the front end 142 of the nozzle seal 132. The sealing and locating portion 136 of the nozzle seal 132 has a cylindrical outer surface 144 which is made to fit into a cylindrical opening 148 in the mold 18 extending to the cavity 92 to locate the front end 76 of the heated nozzle 12 and prevent leakage of melt into the insulative air space 62 between the heated nozzle 12 and the surrounding cooled mold 18. The central nut portion 134 also has an outer surface 114 with facets 116 to be engaged by a wrench. The use of this embodiment is the same as described above.

While the description of the injection molding apparatus having a removable nozzle seal which screws onto the outside of the front end of a heated nozzle has been given with respect to preferred embodiments, it will be evident that various other modifications are possible without departing from the scope of the invention as understood by those skilled in the art and as provided in the following claims.

The embodiments of the invention in which an exclusive property or privilege is claimed is defined as follows:

1. In an injection molding apparatus having at least one heated nozzle (12) extending forwardly into an opening (148) in a cooled mold (18) extending to a cavity (92) with an insulative air space (62) extending between the at least one heated nozzle (12) and the surrounding cooled mold (18), the at least one heated nozzle (12) having a rear end (42), a front end (76), a front portion (94) adjacent the front end (76) with a generally cylindrical outer surface (96), a melt bore (54) extending forwardly therethrough from the rear end (42), and an embedded heater (52) in the nozzle, the improvement comprising;

a thermally conductive mounting sleeve (98) mounted around the cylindrical outer surface (96) of the front portion (94) of the at least one heated nozzle (12), the mounting sleeve (98) having a threaded outer surface (104), and (b) a removable nozzle seal (132) having a front end (142), a central portion (134), a hollow retaining portion (118), extending rearwardly from the central portion (134), and a sealing and locating portion (136) extending forwardly from the central portion (134), the central portion (134) and the forwardly extending sealing and locating portion (136) having a melt bore (138) extending therethrough in alignment with the melt bore (54) in the heated nozzle (12) and leading to a gate (140) at the front end (142) of the nozzle seal (132), the retaining rear portion (118) having a threaded inner surface (120) removably screwed onto the threaded outer surface (104) of the mounting sleeve (98), and the forwardly extending sealing and locating portion (136) fitting into a cylindrical opening (148) in the mold (18) extending to the cavity (92) to locate the front end (76) of the at least one heated nozzle (12) and prevent leakage of melt into the insulative air space (62) between the at least one heated nozzle (12) and the surrounding cooled mold (18).

2. Injection molding apparatus as claimed in claim 1 wherein the central portion (134) of the nozzle seal (132) has an outer surface (114) with an even number of facets (116) for engagement by a suitable tool.

3. Injection molding apparatus as claimed in claim 2 wherein the mounting sleeve (98) has a rearwardly open hole (106) to receive a thermocouple element (108).

4. An injection molding apparatus as claimed in claim 1 wherein said front portion of the at least one heated nozzle is integrally formed with the rest of the nozzle.

5. An injection molding apparatus comprising a heated nozzle (12) having a front end (76) with an embedded heater (52), a thermally conductive mounting sleeve (98) mounted around the front end (76) of the nozzle (12), and a removable nozzle element (110, 132) removably attached to said mounting sleeve (98) at the outside of the front end (76) of the heated nozzle (12).

6. An injection molding apparatus according to claim 5 wherein the mounting sleeve (98) further includes a bore (106) to locate a sensor.

7. An injection molding apparatus according to claim 5 further including a nozzle tip insert (70).

8. An injection molding apparatus according to claim 7 wherein said removable nozzle element (98) has a surface (126, 128) to locate and align said nozzle tip insert (70).

9. An injection molding apparatus according to claim 5 wherein said removable nozzle element is a nozzle seal (110).

10. An injection molding apparatus according to claim 5 wherein said removable nozzle element is a seal mold gate insert (132).

11. An injection molding apparatus comprising a heated nozzle (12) having a front end (76) with an embedded heater (52), a thermally conductive mounting sleeve (98) mounted around the front end (76) of the nozzle (12), said mounting sleeve (98) having a threaded outer surface (104), and a removable nozzle element (110, 132) removably attached to said mounting sleeve (98) at the outside of the front end (76) of the heated nozzle (12), said nozzle element (110, 132) having a threaded inner surface (120) that mates with the threaded outer surface (104) of said mounting sleeve (98).

12. An injection molding apparatus according to claim 11 wherein the mounting sleeve (98) further includes a bore (106) to locate a sensor.

13. An injection molding apparatus as claimed in claim 11 further including a nozzle tip insert (70).

14. An injection molding apparatus as claimed in claim 13 wherein said removable nozzle element (98) has a surface (126, 128) to locate and align said nozzle tip.

15. An injection molding apparatus as claimed in claim 11 wherein said removable nozzle element is a nozzle seal (110).

16. An injection molding apparatus as claimed in claim 11 wherein said removable nozzle element is a seal mold gate insert (132).

* * * * *